(12) United States Patent
Agapiou et al.

(10) Patent No.: US 9,350,217 B2
(45) Date of Patent: May 24, 2016

(54) ROTOR AND METHOD OF FORMING SAME

(75) Inventors: John S. Agapiou, Rochester Hills, MI (US); Thomas A. Perry, Bruce Township, MI (US); James G. Schroth, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 405 days.

(21) Appl. No.: 13/299,420

(22) Filed: Nov. 18, 2011

(65) Prior Publication Data

US 2013/0127291 A1    May 23, 2013

(51) Int. Cl.
*H02K 15/02* (2006.01)
*H02K 17/16* (2006.01)
*H02K 15/00* (2006.01)

(52) U.S. Cl.
CPC .......... *H02K 15/0012* (2013.01); *H02K 17/165* (2013.01); *Y10T 29/49012* (2015.01)

(58) Field of Classification Search
CPC ............. H02K 15/0012; H02K 17/165; Y10T 29/49012
USPC ............................................. 29/598; 310/211
See application file for complete search history.

(56) References Cited

U.S. PATENT DOCUMENTS

| 1,936,244 | A | * | 11/1933 | Bergstrom | .................... 310/211 |
| 6,088,906 | A | | 7/2000 | Hsu et al. | |
| 2008/0185934 | A1 | | 8/2008 | Verhoeven | |

FOREIGN PATENT DOCUMENTS

DE    102010047816 A1    4/2011

OTHER PUBLICATIONS

DE Office Action dated Mar. 20, 2013 for corresponding DE Application 10 2012 220 794.5 filed Nov. 14, 2012.

* cited by examiner

*Primary Examiner* — Livius R Cazan
(74) *Attorney, Agent, or Firm* — Quinn Law Group, PLLC

(57) ABSTRACT

A method of forming a rotor, wherein the rotor includes a plurality of conductor bars each joined to a shorting ring, includes disposing an end of each of the plurality of conductor bars within a respective one of a plurality of cavities defined by the shorting ring. The method also includes, after disposing, deforming the end of each of the conductor bars, and brazing the end of each of the conductor bars to the shorting ring to form the rotor. A rotor includes a shorting ring defining a plurality of cavities therein each having a shape, a plurality of conductor bars each having an end disposed within a respective one of the cavities and joined to the shorting ring, wherein the end is deformable to the shape, and a braze material disposed in contact with the end of each of the conductor bars within a respective one of the cavities.

9 Claims, 8 Drawing Sheets

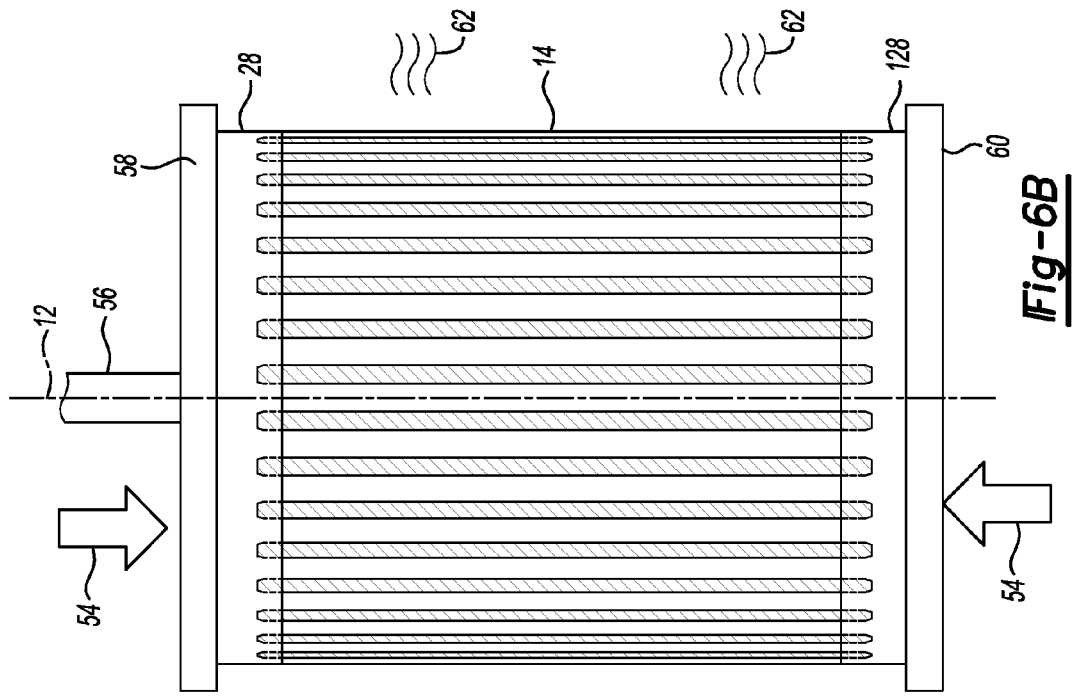
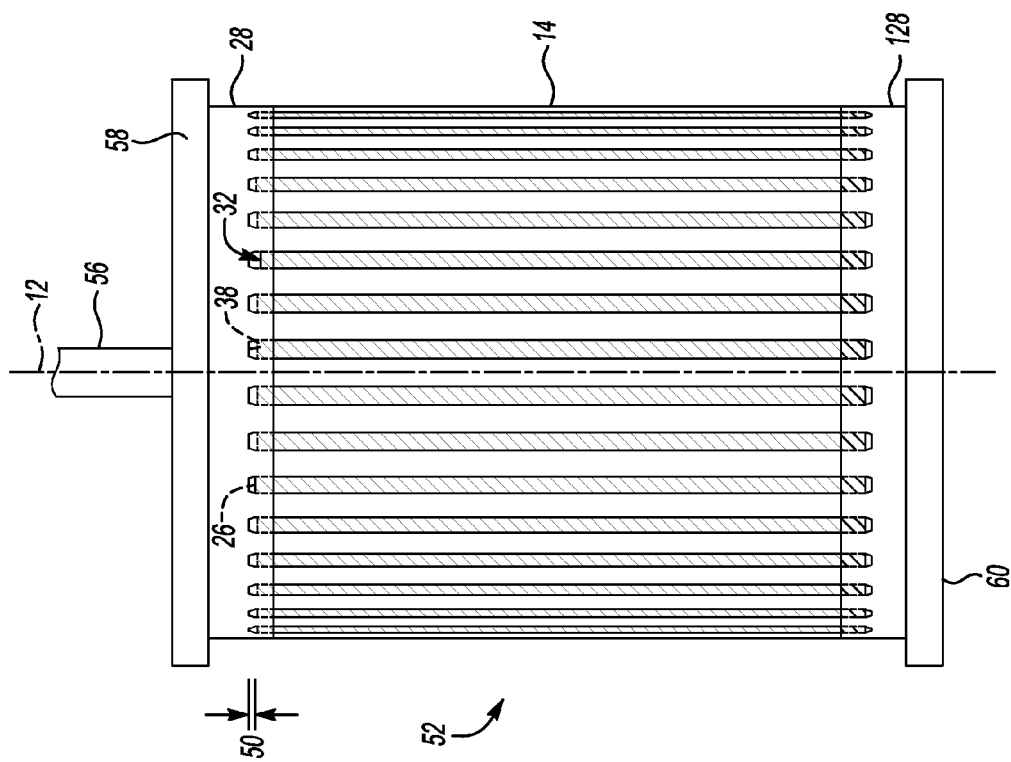

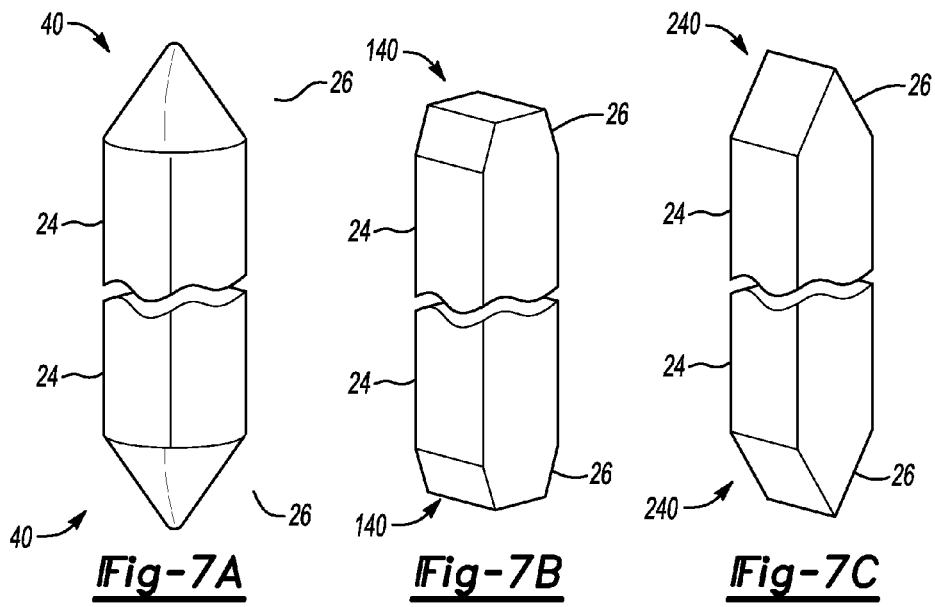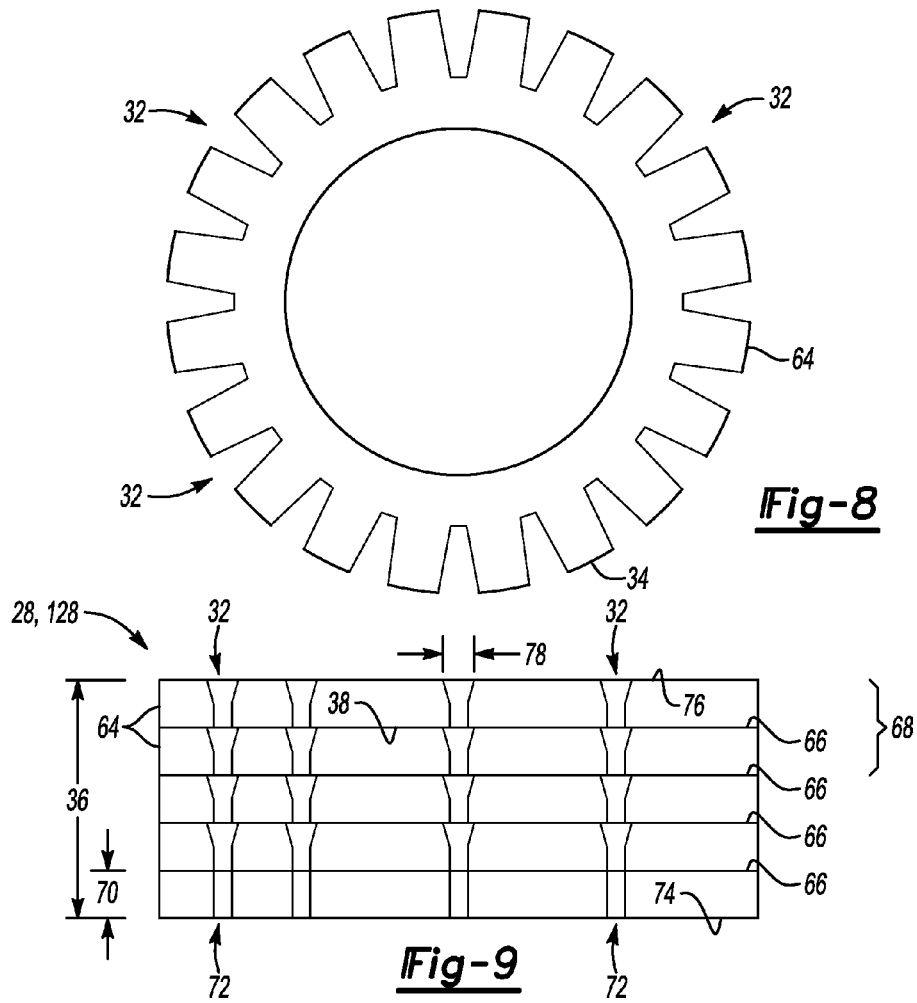

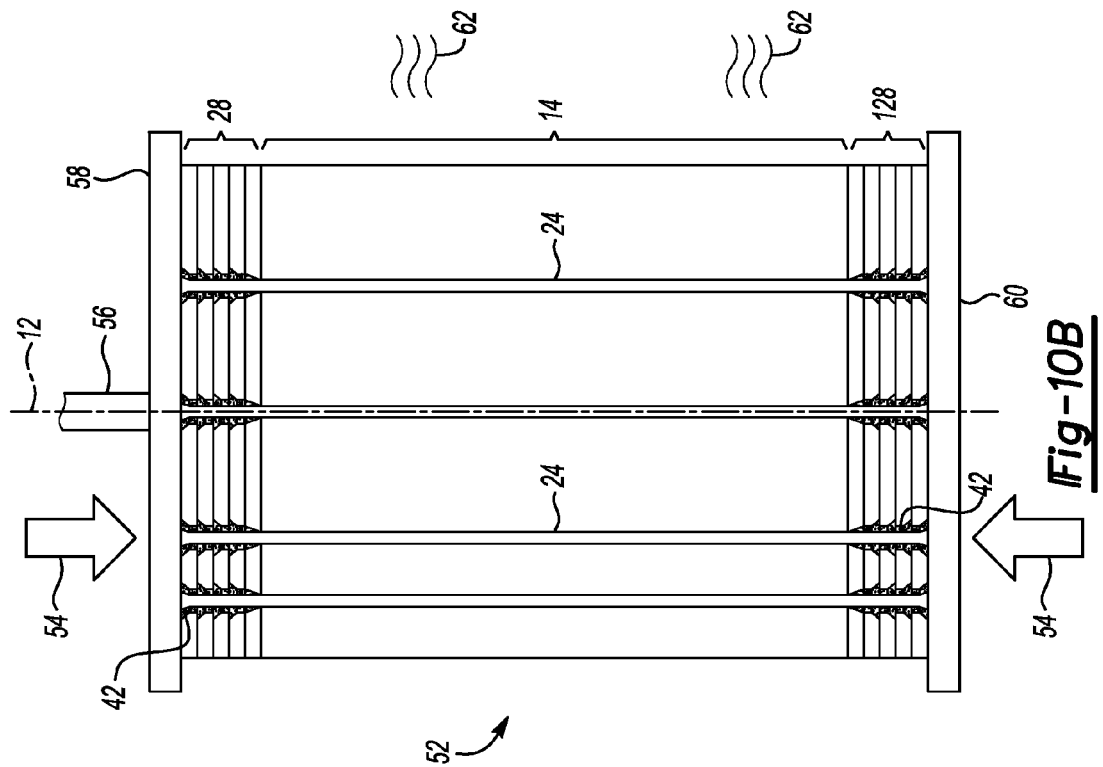
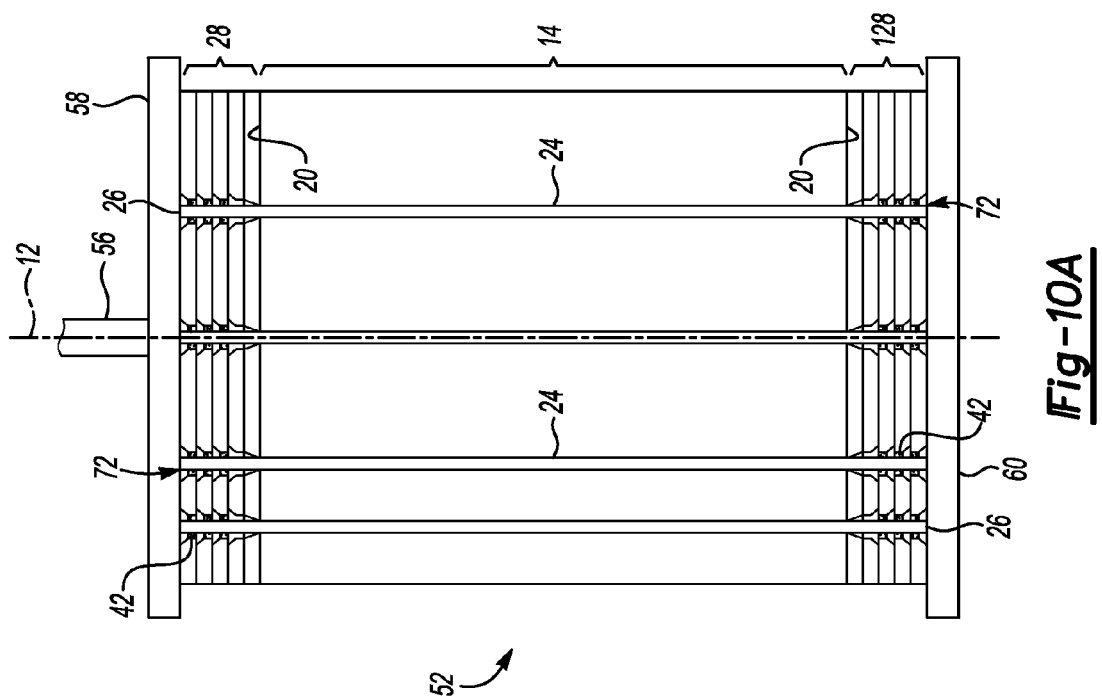

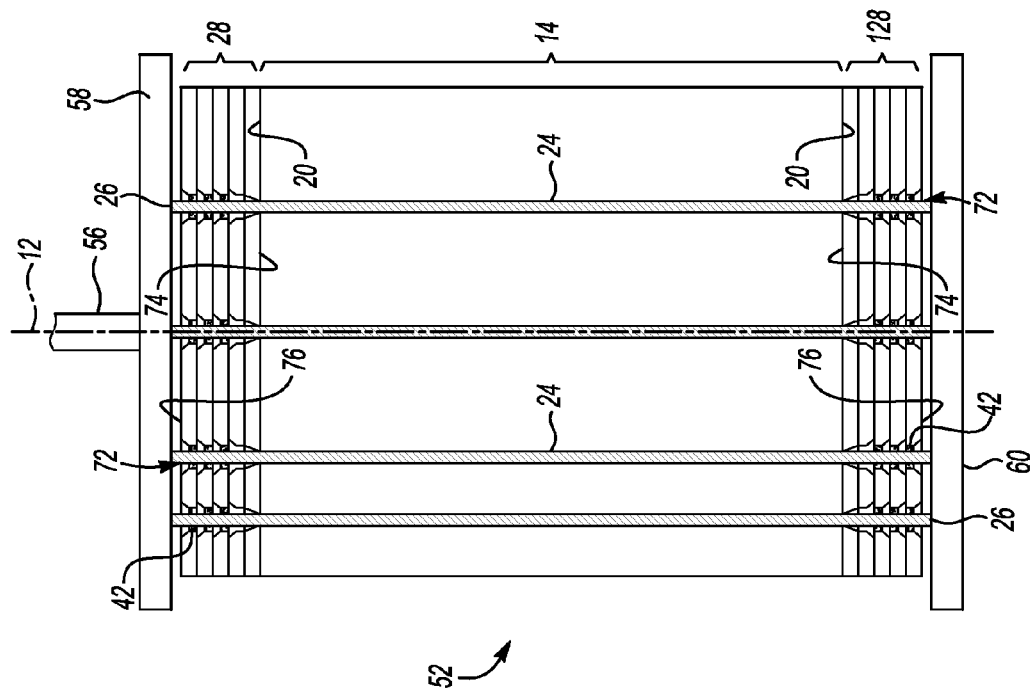
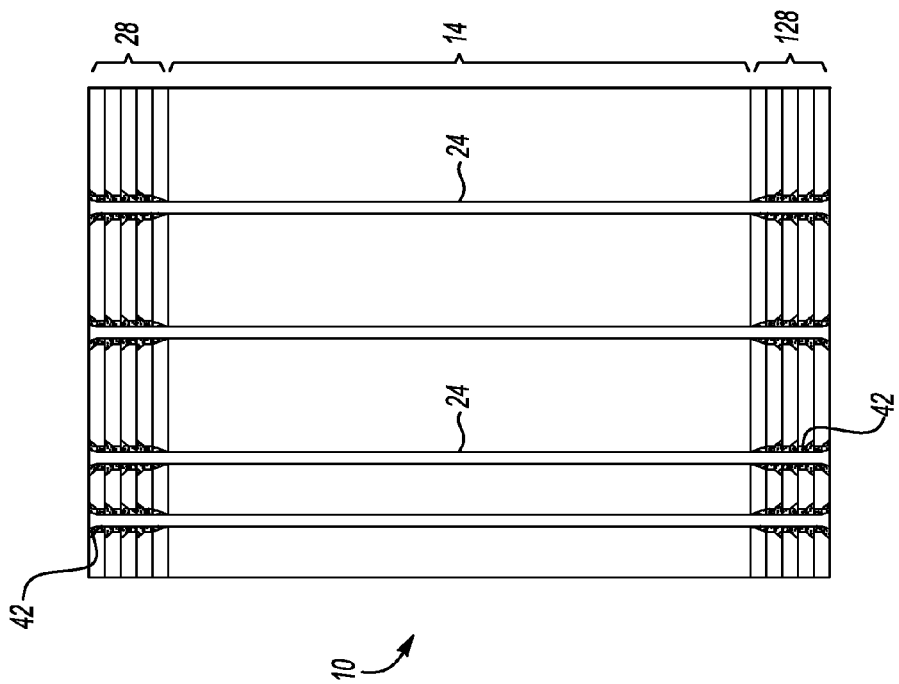

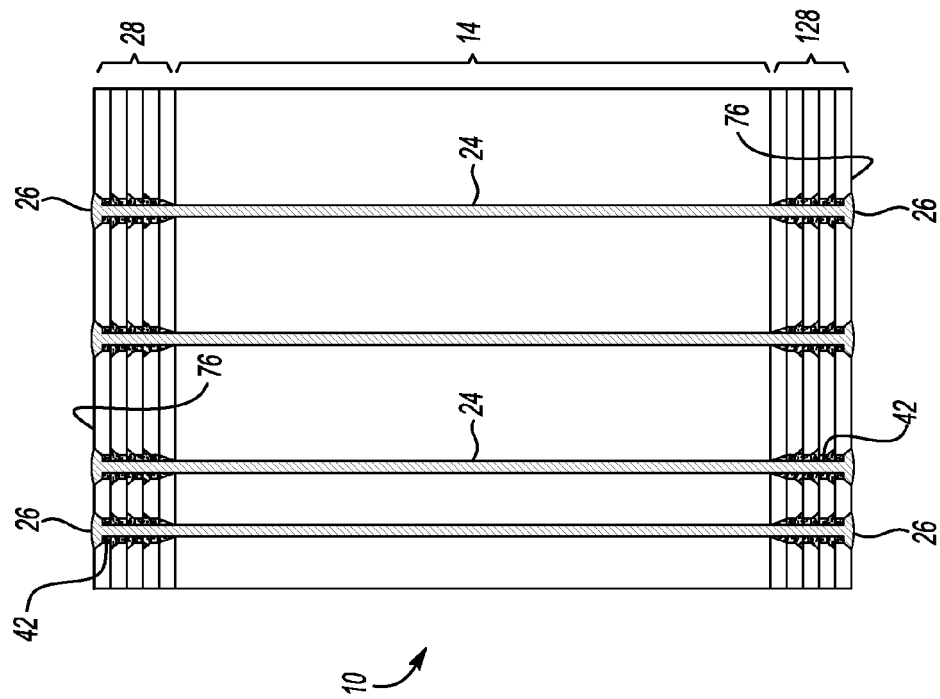
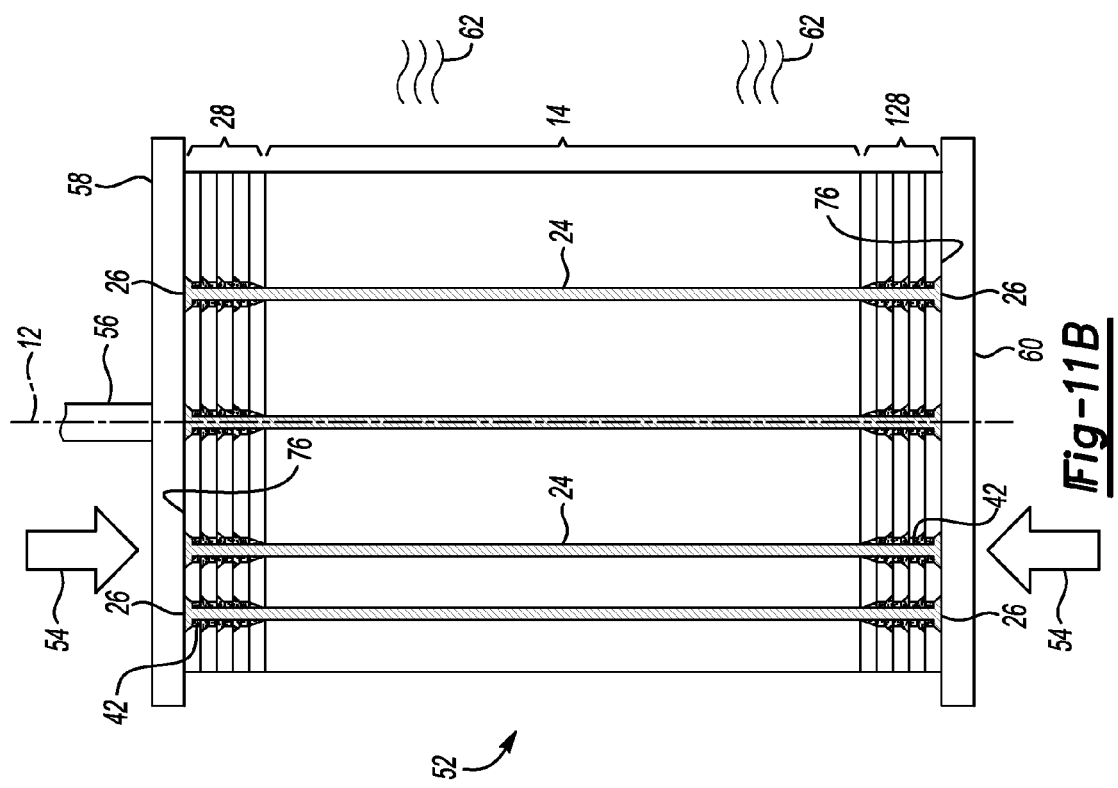

ROTOR AND METHOD OF FORMING SAME

TECHNICAL FIELD

The present disclosure generally relates to a rotor and a method of forming the rotor.

BACKGROUND

Electromagnetic machines such as electric motors, generators, and traction motors are useful for converting energy from one form to another. Such electromagnetic machines often include an element rotatable about an axis of rotation. The rotatable element, i.e., a rotor, may be coaxial with a static element, i.e., a stator, and energy may be converted via relative rotation between the rotor and stator.

One type of electromagnetic machine, an alternating current induction motor, uses induced current flow to magnetize portions of the rotor during motor operation. More specifically, induced current may flow through conductor bars disposed parallel to the axis of rotation along a periphery of the rotor. Further, each conductor bar may be electrically connected to every other conductor bar by shorting rings disposed at each end of the rotor. Such shorting rings generally have complex, intricate shapes, and a joint between the shorting ring and each of the conductor bars must withstand inertial forces during rotor operation.

SUMMARY

A method of forming a rotor, wherein the rotor includes a plurality of conductor bars each joined to a shorting ring, is disclosed. The method includes disposing an end of each of the plurality of conductor bars within a respective one of a plurality of cavities defined by the shorting ring. After disposing, the method includes deforming the end of each of the plurality of conductor bars, and brazing the end of each of the plurality of conductor bars to the shorting ring to form the rotor.

In one embodiment, the method includes disposing an end of each of the plurality of conductor bars within a respective one of a plurality of cavities defined by the shorting ring. The method also includes stacking a plurality of conductive lamination layers adjacent one another to define a faying interface between each pair of adjacent conductive lamination layers to thereby form the shorting ring, wherein each of the plurality of conductive lamination layers defines the plurality of cavities therethrough, and wherein the shorting ring has an outer edge, a mating surface, and an exterior surface spaced apart from the mating surface. After stacking, the method includes aligning each of the plurality of cavities of one of the plurality of conductive lamination layers with each of the plurality of cavities of every adjacent conductive lamination layer to thereby define a plurality of channels through the shorting ring. Each of the plurality of channels extends from the mating surface to the exterior surface through an entire thickness of the shorting ring and is spaced apart from one another along the outer edge. In addition, the method includes assembling a steel lamination assembly. The steel lamination assembly includes the plurality of conductor bars, and a steel lamination stack defining a plurality of slots therein and having an end surface. Each of the plurality of conductor bars is disposed within a respective one of the plurality of slots so that the end of each of the plurality of conductor bars extends from the end surface of the steel lamination stack. Further, disposing includes inserting the end of each of the plurality of conductor bars within a respective one of the plurality of channels so that the end protrudes from the exterior surface of the shorting ring, and the mating surface abuts the end surface of the steel lamination stack. After inserting, the method includes depositing a braze material within each of the plurality of channels to thereby form a rotor assembly. After disposing, the method also includes deforming the end of each of the plurality of conductor bars, wherein deforming includes compressing the shorting ring and the rotor assembly so that the end of each of the plurality of conductor bars contacts the exterior surface and deforms within the respective one of the plurality of channels. In addition, after disposing, the method includes brazing the end of each of the plurality of conductor bars to the shorting ring to form the rotor. Brazing at least partially disposes the braze material on the faying interface between adjacent conductive lamination layers to thereby join each of the plurality of conductive lamination layers and form the shorting ring. Further, brazing disposes the braze material along each of the plurality of conductor bars within each of the plurality of channels to form the rotor.

A rotor includes a shorting ring defining a plurality of cavities therein each having a shape. The rotor further includes a plurality of conductor bars each having an end disposed within a respective one of the plurality of cavities and joined to the shorting ring, wherein the end is deformable to the shape. The rotor also includes a braze material disposed in contact with the end of each of the plurality of conductor bars within a respective one of the plurality of cavities.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

BRIEF DESCRIPTION OF THE DRAWINGS

FIG. 6A is a schematic illustration of a side view of the rotor assembly of FIG. 3, wherein the rotor assembly is disposed within a fixture;

FIG. 6B is a schematic illustration of a side view of the rotor assembly of FIG. 6A, wherein the end of each of the conductor bars is deformed and joined to the shorting ring;

FIG. 7A is a schematic perspective fragmentary illustration of a representative end of one of the plurality of conductor bars of FIG. 1 after deforming the end, wherein the end has a conical shape;

FIG. 7B is a schematic perspective fragmentary illustration of another embodiment of the representative end of one of the plurality of conductor bars of FIG. 1 after deforming the end, wherein the end has a trapezoidal shape;

FIG. 7C is a schematic perspective fragmentary illustration of yet another embodiment of the representative end of one of the plurality of conductor bars of FIG. 1 after deforming the end, wherein the end has a triangular shape;

FIG. 8 is a schematic illustration of a top view of an individual conductive lamination layer of another embodiment of the shorting ring of FIG. 1;

FIG. 9 is a schematic illustration of a side view of a plurality of the conductive lamination layers of FIG. 8 stacked adjacent one another to form another embodiment of the shorting ring of FIG. 1;

FIG. 10A is a schematic illustration of a side view of another embodiment of the rotor assembly of FIG. 3, wherein the rotor assembly is disposed within a fixture;

FIG. 10B is a schematic illustration of a side view of the rotor assembly of FIG. 10A, wherein the end of each of the conductor bars is deformed and joined to the shorting ring;

FIG. 10C is a schematic illustration of a side view of another embodiment of the rotor of FIG. 1;

FIG. 11A is a schematic partially cross-sectional illustration of a side view of yet another embodiment of the rotor assembly of FIG. 3, wherein the rotor assembly is disposed within a fixture;

FIG. 11B is a schematic partially cross-sectional illustration of a side view of the rotor assembly of FIG. 11A, wherein each of the conductor bars is deformed and joined to the shorting ring; and FIG. 11C is a schematic partially cross-sectional illustration of a side view of yet another embodiment of the rotor of FIG. 1.

DETAILED DESCRIPTION

Figure 1:
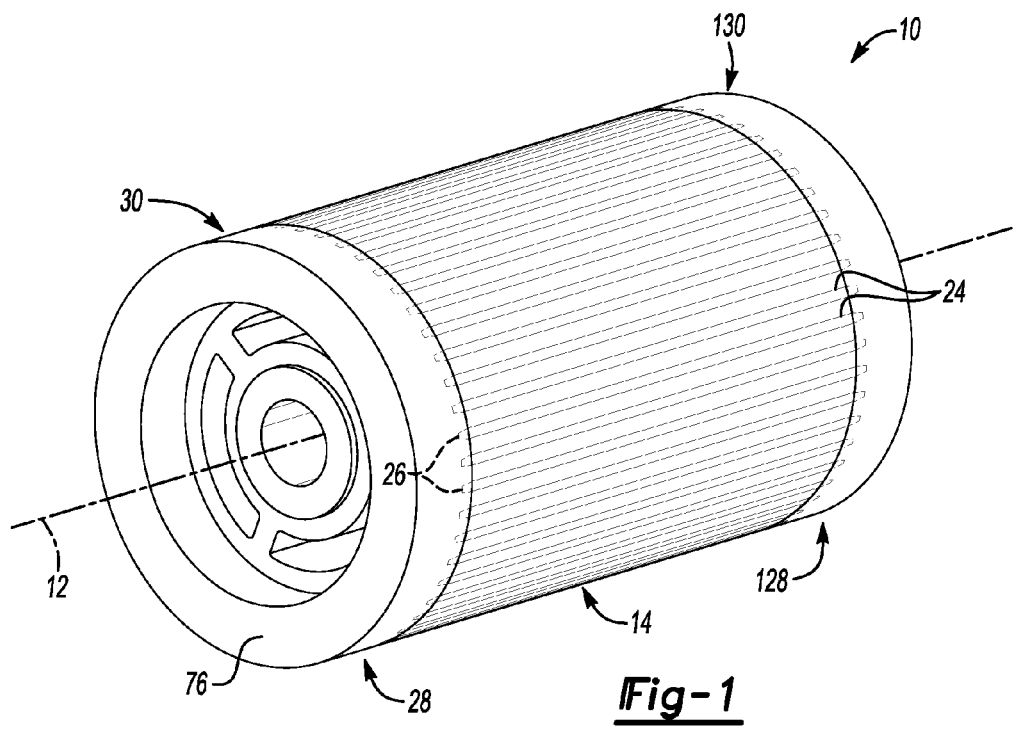
FIG. 1 is a schematic perspective illustration of a rotor, wherein the rotor includes a plurality of conductor bars each joined to a shorting ring.

Referring to the Figures, wherein like reference numerals refer to like elements, a rotor 10 is shown generally in FIG. 1. The rotor 10 may be useful for electromagnetic machines (not shown) for automotive applications, including alternating current induction motors. However, the rotor 10 may also be useful for electromagnetic machines for non-automotive applications, including generators and electric motors for residential and commercial applications.

Figure 2:
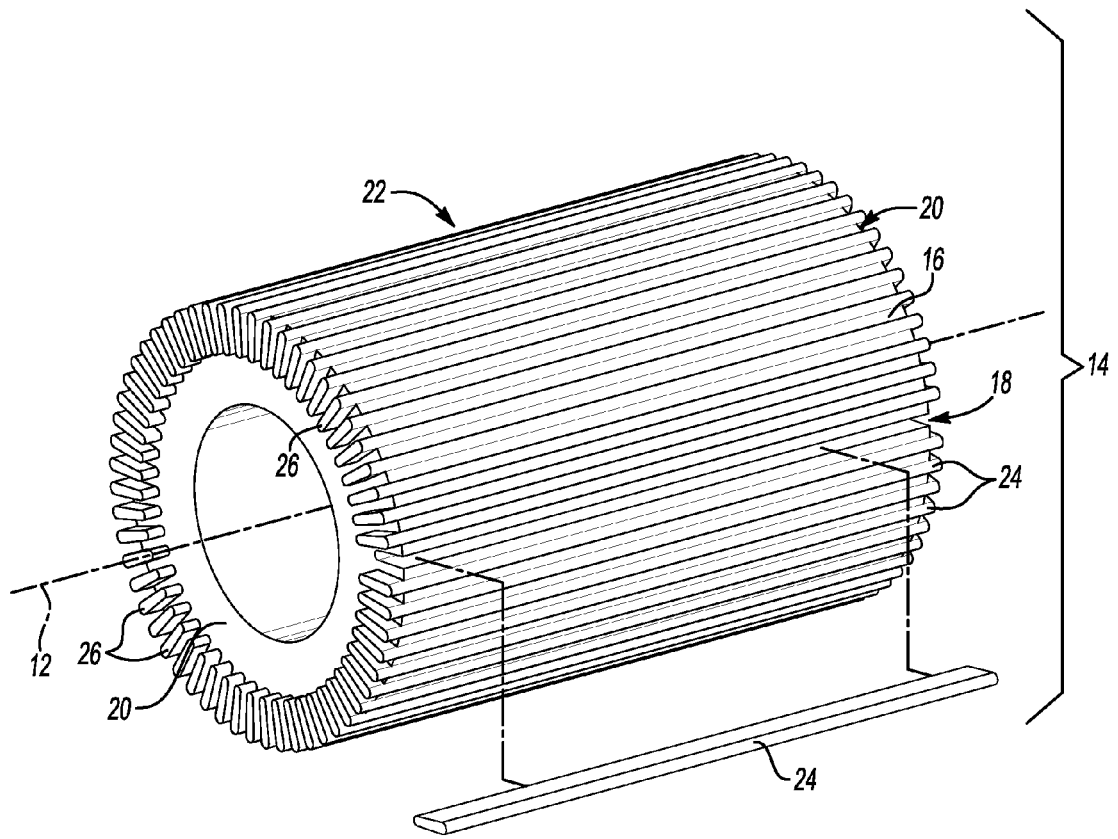
FIG. 2 is a schematic perspective exploded illustration of a steel lamination assembly assembled during a portion of a method of forming the rotor of FIG. 1.

By way of general explanation and described with reference to FIG. 1, the rotor 10 may be rotatable about an axis 12 of rotation and may rotate with respect to a stationary stator (not shown) of the electromagnetic machine (not shown). Further, the rotor 10 may include a generally cylindrical core or steel lamination assembly 14. The steel lamination assembly 14 may include a steel lamination stack 16 (FIG. 2) formed from individual annular layers (not shown) of lamination steel, e.g., silicon steel, stacked adjacent one another. Further, as shown in FIG. 2, the steel lamination stack 16 may define a plurality of slots 18 therein and have an end surface 20. That is, when the individual annular layers of lamination steel are stacked adjacent one another, the individual annular layers may align to define the plurality of slots 18 spaced about a periphery 22 of the steel lamination stack 16. The plurality of slots 18 may be parallel to the axis 12 of rotation and may each be configured to receive a conductor bar 24. Further, although not shown, the plurality of slots 18 may be arranged in a skewed configuration about the axis 12 of rotation.

Therefore, with continued reference to FIG. 2, the steel lamination assembly 14 may include the plurality of conductor bars 24, wherein each of the plurality of conductor bars 24 is disposed within a respective one of the plurality of slots 18 so that an end 26 of each of the plurality of conductor bars 24 extends from the end surface 20 of the steel lamination stack 16.

Therefore, referring again to FIG. 1, the rotor 10 may include the plurality of conductor bars 24 spaced equidistantly about the axis 12 of rotation. Each conductor bar 24 may be configured to conduct electrical current during operation of the electromagnetic machine (not shown). Further, each conductor bar 24 may terminate at and connect with the shorting ring 28 at a terminus 30 of the rotor 10. Therefore, the rotor 10 may include two shorting rings 28, e.g., one shorting ring 28, 128, disposed at each respective terminus 30, 130 of the rotor 10. As such, the shorting rings 28, 128 may electrically connect each of the plurality of conductor bars 24 to one another. The shorting rings 28, 128 and each of the plurality of conductor bars 24 may be formed from an electrically-conductive material, such as, but not limited to, copper or aluminum.

Accordingly, with continued reference to the Figures and as set forth in more detail below, the rotor 10 (FIG. 1) includes the shorting ring 28, 128 (FIG. 1) defining a plurality of cavities 32 (FIG. 3) therein each having a shape (denoted generally by 40, 140, and 240 in FIGS. 4A-4C and 7A-7C). The rotor 10 also includes the plurality of conductor bars 24 (FIG. 1) each having the end 26 (FIG. 1) disposed within a respective one of the plurality of cavities 32 and joined to the shorting ring 28, 128, wherein the end 26 is deformable to the shape 40, 140, 240. In addition, the rotor 10 includes a braze material 42 (FIGS. 5A, 5B, 10A-10C, and 11A-11C, respectively) disposed in contact with the end 26 of each of the plurality of conductor bars 24 within a respective one of the plurality of cavities 32, as also set forth in more detail below.

Figure 3:
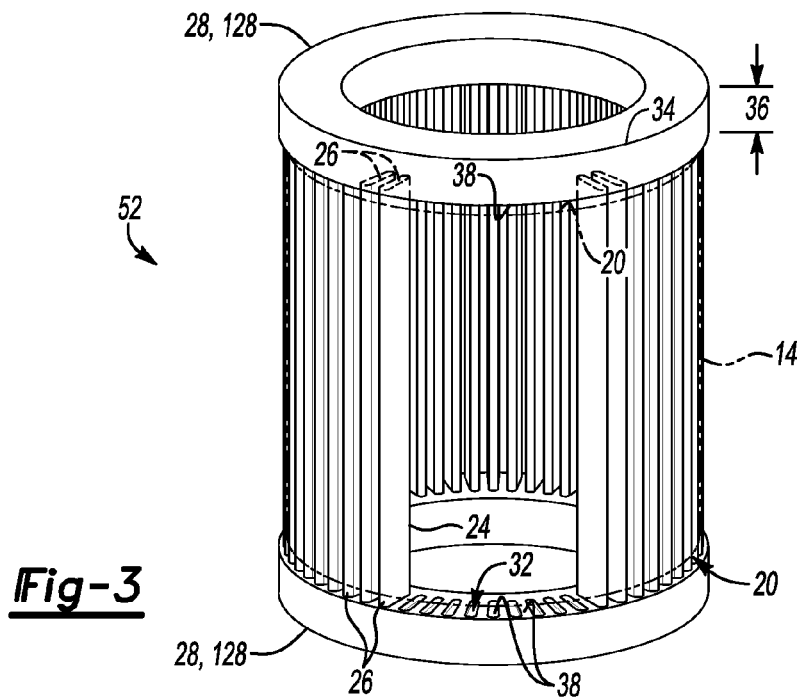
FIG. 3 is a schematic perspective illustration of a rotor assembly formed during a portion of the method of forming the rotor of FIG. 1, wherein an end of each of the plurality of conductor bars is disposed within a respective one of a plurality of cavities defined by the shorting ring of FIG. 1.

Referring now to FIG. 3, a method of forming the rotor 10 (FIG. 1), wherein the rotor 10 includes the plurality of conductor bars 24 each joined to the shorting ring 28, 128, includes disposing the end 26 of each of the plurality of conductor bars 24 within a respective one of the plurality of cavities 32 defined by the shorting ring 28, 128. That is, for the method, as best shown in FIG. 3, the shorting ring 28, 128 has an outer edge 34, and defines the plurality of cavities 32 each spaced apart from one another, e.g., radially about the axis 12 of rotation.

With continued reference to FIG. 3, in one embodiment, each of the plurality of cavities 32 does not extend through an entire thickness 36 of the shorting ring 28, 128. In this embodiment, the shorting ring 28, 128 has a faying surface 38, and the faying surface 38 defines the plurality of cavities 32 therein such that the plurality of cavities 32 does not extend through the entire thickness 36 of the shorting ring 28, 128. For this embodiment, the shorting ring 28, 128 may be formed in any manner. For example, depending on cost considerations, the plurality of cavities 32 may be machined into the shorting ring 28, 128. Alternatively, by way of non-limiting examples, the shorting ring 28, 128 may be die cast, precision sand cast, investment cast, or forged. As set forth above, the shorting ring 28, 128 may be formed from copper.

In addition, as described with reference to FIGS. 4A-4C, each of the plurality of cavities 32 has the shape (denoted generally at 40, 140, and 240 in FIGS. 4A-4C, respectively). It is to be appreciated that each of the plurality of cavities 32 may have any shape suitable for allowing and containing deformation of a respective end 26 of each of the plurality of conductor bars 24, as set forth in more detail below. By way of non-limiting examples, the shape 40, 140, 240 of each of the plurality of cavities 32 may be selected from a group including triangular, conical, and trapezoidal.

Figure 5A:
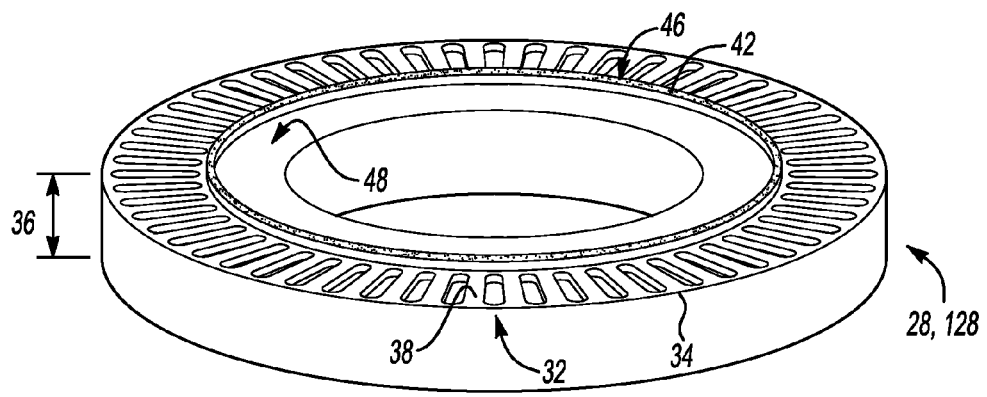
FIG. 5A is a schematic perspective illustration of a braze material disposed on one embodiment of the shorting ring of FIG. 1.
Figure 5B:
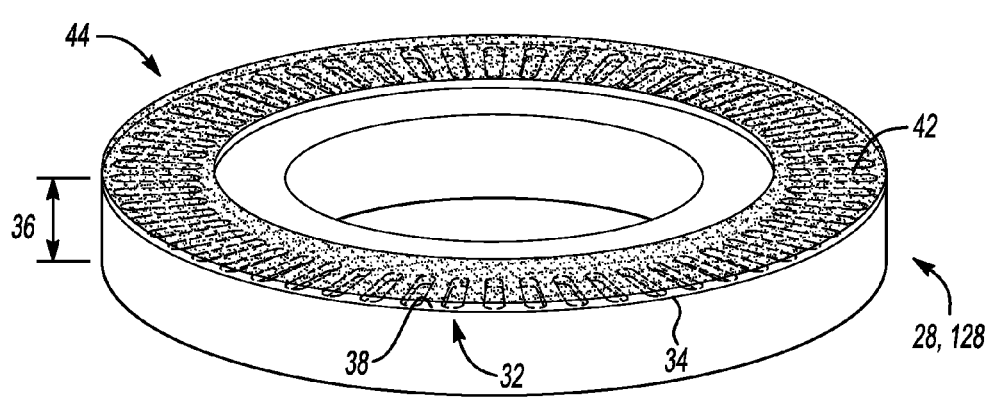
FIG. 5B is a schematic perspective illustration of a braze material disposed on another embodiment of the shorting ring of FIG. 1.

Referring again to the method as described with reference to FIGS. 5A and 5B, the method may include depositing or placing the braze material 42 onto the faying surface 38 of the shorting ring 28, 128. The braze material 42 may be provided, for example, in annular paste or powder form (as represented generally by 44 in FIG. 5B) or may be provided in annular ring 46 or wire form (as shown in FIG. 5A). Alternatively or additionally, although not shown, the braze material 42 may be provided as a plurality of shims or sheets that are each configured to be individually placed within a respective one of the plurality of cavities 32.

That is, in one embodiment shown in FIG. 5A, the faying surface 38 may define an annular trough 48 therein adjacent to the plurality of cavities 32. For this embodiment, depositing the braze material 42 onto the faying surface 38 may include arranging the annular ring 46 of braze material 42 within the annular trough 48. In another embodiment, as shown in FIG. 5B, depositing the braze material 42 onto the faying surface 38 may include covering the faying surface 38 within each of the plurality of cavities 32 with the annular paste or powder 44 of braze material 42. For example, the braze material 42 may cover an entirety of the faying surface 38 within each of the plurality of cavities 32. Alternatively, the braze material 42 may cover only a portion of the faying surface 38 within each of the plurality of cavities 32.

The braze material 42 may be transitionable between an initial state, e.g., the annular ring 46 (FIG. 5A) or annular paste or powder 44 (FIG. 5B), a flowable state (not shown), and a fixed state (not shown). In particular, the braze material 42 may be transitionable between the initial state, the flowable state, and the fixed state along the faying surface 38, e.g., within the annular trough 48. That is, the braze material 42 may, for example, melt upon exposure to elevated temperatures and transition from the aforementioned annular ring 46 or annular paste or powder 44, i.e., the initial state, to a fluid which flows into each of the plurality of cavities 32. Subsequently, upon exposure to a reduced temperature, the braze material 42 may transition from the flowable state to the fixed state to thereby braze or adhere the end 26 (FIG. 3) of each of the plurality of conductor bars 24 (FIG. 3) to the shorting ring 28, 128 within the respective one of the plurality of cavities 32.

Non-limiting examples of suitable braze material 42 includes binary copper-phosphorus alloys; copper-phosphorus alloys including silver; copper-phosphorus alloys including near-eutectic silver; copper-phosphorus alloys including tin; aluminum-silicon alloys; and combinations thereof.

Referring again to the method, the method may also include assembling the steel lamination assembly 14 (FIGS. 1 and 2). For example, the steel lamination assembly 14 may be assembled prior to disposing the end 26 of each of the plurality of conductor bars 24 within the respective one of the plurality of cavities 32. Further, as described with reference to FIG. 2, assembling may include disposing each of the plurality of conductor bars 24 within the respective one of the plurality of slots 18 so that each of the plurality of conductor bars 24 extends from the end surface 20 of the steel lamination stack 16.

Therefore, as described with reference to FIG. 6A, disposing may include inserting the end 26 of each of the plurality of conductor bars 24 within the respective one of the plurality of cavities 32 to define a gap 50 between the end 26 of at least one of the plurality of conductor bars 24 and the faying surface 38 within the respective one of the plurality of cavities 32 and thereby form a rotor assembly 52. That is, the rotor assembly 52 may include the steel lamination assembly 14 sandwiched between two shorting rings 28, 128, wherein the end 26 of each of the plurality of conductor bars 24 is disposed within the respective one of the plurality of cavities 32 defined by the shorting rings 28, 128. Although shown generally in FIGS. 6A and 6B, the rotor assembly 52 may include, for example, from about 50 to about 100 conductor bars 24, and each of the plurality of conductor bars 24 may have a length (not shown) of, for example, from about 99.9 mm to about 100.1 mm, e.g., about 100 mm. However, each conductor bar 24 may have a length that is longer or shorter than an adjacent conductor bar 24 by up to about 0.1 mm. As such, disposing the end 26 of each of the plurality of conductor bars 24 within the respective one of the plurality of cavities 32 may define the gap 50 between the end 26 of at least one of the plurality of conductor bars 24 and the faying surface 38 within the respective one of the plurality of cavities 32. That is, the gap 50 may be defined by a tolerance difference between the respective lengths of the plurality of conductor bars 24.

Further, after disposing the end 26 of each of the plurality of conductor bars 24 within the respective one of the plurality of cavities 32, the method includes deforming the end 26 of each of the plurality of conductor bars 24. Referring to FIG. 6B, deforming may include applying a force (denoted generally by arrows 54) to the shorting ring 28, 128 along the axis 12 of rotation. That is, deforming may include compressing the shorting ring 28, 128 against the steel lamination assembly 14. The force 54 may be applied to the shorting ring 28, 128 in any manner. For example, once assembled, the rotor assembly 52 (FIGS. 3 and 6A) may be disposed within a fixture 56, such as a press including an upper platen 58 and a lower platen 60. The force 54 may be applied to the shorting ring 28, 128 along the axis 12 of rotation by compressing and moving the moveable upper platen 58 towards the stationary lower platen 60 to thereby squeeze the rotor assembly 52 therebetween. As such, as best shown in FIG. 6B, compressing may substantially eliminate the gap 50 (FIG. 6A) so that the rotor assembly 52 is compacted in preparation for forming the rotor 10 (FIG. 1).

Figure 4A:
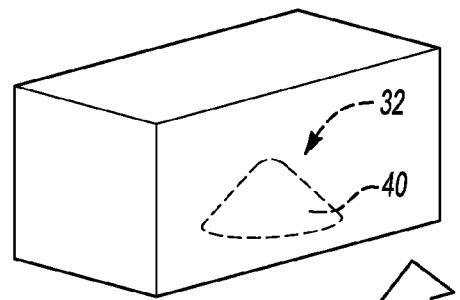
FIG. 4A is a schematic perspective fragmentary illustration of a representative end of each of the plurality of conductor bars of FIG. 1 before disposal within a representative one of the plurality of cavities of FIG. 3.
Figure 4A:
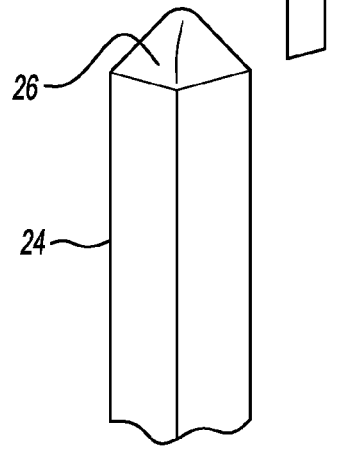
Figure 4B:
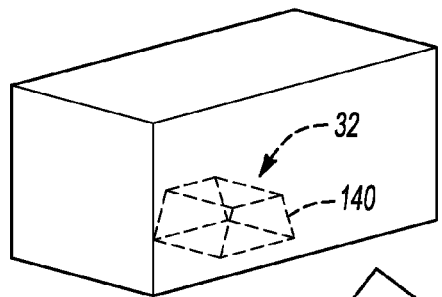
FIG. 4B is a schematic perspective illustration of the representative end of FIG. 4A before disposal within another embodiment of one of the plurality of cavities of FIG. 3.
Figure 4B:
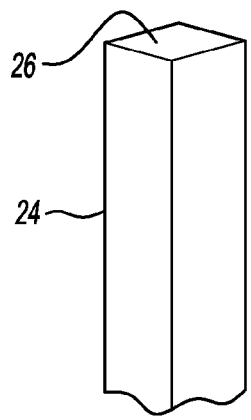
Figure 4C:
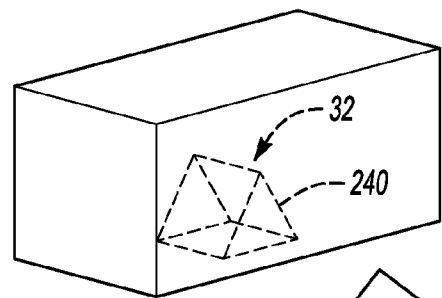
FIG. 4C is a schematic perspective illustration of the representative end of FIG. 4A before disposal within yet another embodiment of one of the plurality of cavities of FIG. 3.
Figure 4C:
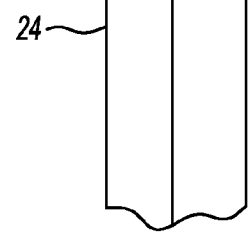

As such, with continued reference to FIGS. 4A-4C and 7A-7C, deforming may include compressing the rotor assembly 52 (FIG. 3) so that the end 26 of each of the plurality of conductor bars 24 deforms within the respective one of the plurality of cavities 32 (FIGS. 4A-4C). Stated differently, deforming may include molding the end 26 of each of the plurality of conductor bars 24 to the shape 40, 140, 240 (FIGS. 4A-4C, respectively) of each of the plurality of cavities 32.

For example, as described with reference to FIGS. 4A and 7A, deforming may include molding the end 26 of each of the plurality of conductor bars 24 so that the end 26 of each of the plurality of conductor bars 24 has the conical shape 40. Alternatively, as described with reference to FIGS. 4B and 7B, deforming may include molding the end 26 of each of the plurality of conductor bars 24 so that the end 26 has the trapezoidal shape 140. Similarly, in another embodiment, deforming may include molding the end 26 of each of the plurality of conductor bars 24 so that the end 26 has the triangular shape 240. Such deforming conforms the end 26 of the conductor bars 24 to the respective cavity 32, and provides a mechanical join between each of the plurality of conductor bars 26 and the shorting ring 28, 128. That is, deforming mechanically joins the end 26 within each of the respective one of the plurality of cavities 32 so that the join between each conductor bar 24 and end 26 may not loosen during high-speed rotation of the rotor 10 (FIG. 1).

In addition, deforming allows for variations in length of the conductor bars 24 during assembly of the rotor assembly 52. That is, as set forth above, each conductor bar 24 may have a length that is longer or shorter than an adjacent conductor bar 24 by up to about 0.1 mm. Deforming the end 26 of each of the plurality of conductor bars 24 allows for variations in length of the conductor bars 24 during assembly of the rotor assembly 52. Stated differently, deforming ensures that each conductor bar 24 contacts the shorting ring 28, 128 within the respective cavity 32 after deformation. That is, each cavity 32 allows a space for any excess length to deform. In addition, deforming eliminates any variation in lengths of each of the plurality of conductor bars 24 and allows for each conductor bar 24, but especially for comparatively longer conductor bars 24, to deform at the end 26 to fill the respective cavity 32.

Referring again to the method, after disposing the end 26 of each of the plurality of conductor bars 24 within the respective one of the plurality of cavities 32, the method further includes brazing the end 26 of each of the plurality of conductor bars 24 to the shorting ring 28, 128 to form the rotor 10 (FIG. 1). Brazing may generally include increasing a temperature of the braze material 42 (FIGS. 5A and 5B) to above a melting temperature of the braze material 42 to transition the braze material 42 from the initial state, e.g., the annular ring 46 (FIG. 5A) or annular paste or powder 44 (FIG. 5B), to the flowable state, and then cooling the braze material 42 to below the melting temperature so that the braze material 42 transitions from the flowable state to the fixed state and thereby joins the end 26 of each of the plurality of conductor bars 24 to the shorting ring 28, 128 to form the rotor 10 (FIG. 1).

More specifically, for the embodiment described with reference to FIG. 5A wherein the annular ring 46 of braze material 42 is disposed within the annular trough 48, brazing may melt the braze material 42 within the annular trough 48. Subsequently, as the braze material 42 cools and transitions from the flowable state to the fixed state, the braze material 42 may join the end 26 of each of the plurality of conductor bars 24 to the shorting ring 28, 128. As such, deforming and brazing may join the end 26 of each of the plurality of conductor bars 24 to the shorting ring 28, 128. In particular, deforming and brazing may mechanically interlock the end 26 of each of the plurality of conductor bars 24 to the shorting ring 28, 128 within the respective one of the plurality of cavities 32.

Alternatively, for the embodiment described with reference to FIG. 5B wherein the annular paste or powder 44 of braze material 42 covers the faying surface 38 of each of the plurality of cavities 32, brazing may melt the braze material 42 within each of the plurality of cavities 32. That is, brazing may at least partially fill each of the plurality of cavities 32 with the braze material 42 to thereby join each of the plurality of conductor bars 24 to the shorting ring 28, 128. More specifically, subsequently, as the braze material 42 cools and transitions from the flowable state to the fixed state, the braze material 42 may join or adhere the end 26 of each of the plurality of conductor bars 24 to the shorting ring 28, 128 within each respective one of the plurality of cavities 32. As such, deforming and brazing may join the end 26 of each of the plurality of conductor bars 24 to the shorting ring 28, 128. In particular, deforming and brazing may both mechanically interlock and braze the end 26 of each of the plurality of conductor bars 24 to the shorting ring 28, 128 within the respective one of the plurality of cavities 32.

For the method, brazing may occur after deforming, or deforming may be concurrent to brazing the end 26 of each of the plurality of conductor bars 24. That is, referring again to FIG. 6B, the method may include applying the force 54 to the rotor assembly 52 (FIGS. 3 and 6A), i.e., the steel lamination assembly 14 (FIG. 1) and the shorting ring 28, 128 including the braze material 42 (FIGS. 5A and 5B) disposed thereon, while brazing the end 26 of each of the plurality of conductor bars 24 to the respective one of the plurality of cavities 32. For example, the braze material 42 may be heated (denoted generally by symbols 62 in FIG. 6B) while deforming the end 26 of each of the plurality of conductor bars 24 to thereby form the rotor 10 (FIG. 1).

In another embodiment of the method as described with reference to FIGS. 8 and 9, the method may include forming the shorting ring 28, 128. In particular, in this embodiment, the method may include stacking a plurality of conductive lamination layers 64 (FIG. 8) adjacent one another to define a faying interface 66 (FIG. 9) between each pair 68 (FIG. 9) of adjacent conductive lamination layers 64 to thereby form the shorting ring 28, 128. The plurality of conductive lamination layers 64 may be formed from an electrically-conductive material such as, for example, copper or aluminum, and may have a thickness 70 (FIG. 9) of from about 1 mm to about 3 mm. In addition, the shorting ring 28, 128 may include from about four to about seven, e.g., about five, individual conductive lamination layers 64 stacked adjacent one another.

For this embodiment, each of the plurality of conductive lamination layers 64 defines the plurality of cavities 32 therethrough. That is, as best shown in FIG. 9, each of the plurality of cavities 32 extends through the thickness 70 of each conductive lamination layer 64.

With continued reference to FIG. 9, after stacking, the method includes aligning each of the plurality of cavities 32 of one of the plurality of conductive lamination layers 64 with each of the plurality of cavities 32 of every adjacent conductive lamination layer 64 to thereby define a plurality of channels 72 through the shorting ring 28, 128. That is, each of the plurality of channels 72 extends through the entire thickness 36 (FIG. 9) of the shorting ring 28, 128 and is spaced apart from one another along the outer edge 34 (FIG. 8). More specifically, the shorting ring 28, 128 may have a mating surface 74 and an exterior surface 76 spaced apart from the mating surface 74. In one arrangement, as described with reference to FIG. 9, aligning may configure the plurality of cavities 32 so that each of the plurality of channels 72 tapers through the entire thickness 36 of the shorting ring 28, 128. That is, each of the plurality of channels 72 may extend and taper from the exterior surface 76 to the mating surface 74, and as such, may have a comparatively larger width 78 at the exterior surface 76 of the shorting ring 28, 128 than at the mating surface 74 of the shorting ring 28, 128.

For this embodiment, referring now to FIG. 10A, the method may also include assembling the steel lamination assembly 14, as set forth above. For example, the steel lamination assembly 14 may be assembled prior to disposing the end 26 of each of the plurality of conductor bars 24 within the respective one of the plurality of cavities 32. Further, as described with reference to FIG. 2, assembling may include disposing each of the plurality of conductor bars 24 within the respective one of the plurality of slots 18 so that each of the plurality of conductor bars 24 extends from the end surface 20 of the steel lamination stack 16 (FIG. 2).

Therefore, with continued reference to FIG. 10A, for this embodiment, the method includes disposing an end 26 of each of the plurality of conductor bars 24 within the respective one of the plurality of cavities 32 (FIG. 9), i.e., the plurality of channels 72, defined by the shorting ring 28, 128. More specifically, as shown in FIG. 10A, disposing includes inserting the end 26 of each of the plurality of conductor bars 24 within a respective one of the plurality of channels 72.

In addition, for this embodiment, after inserting, the method includes depositing the braze material 42 (FIGS. 10A and 10B) within each of the plurality of channels 72 to thereby form a rotor assembly 52 (FIG. 10A). For example, the braze material 42 may be in powder form (illustrated generally at 44 in FIG. 5B) and may be deposited or inserted into the each of the plurality of channels 72.

Referring now to FIG. 10B, for this embodiment, the method also includes, after disposing, deforming the end 26 of each of the plurality of conductor bars 24, wherein deforming includes compressing the shorting ring 28, 128 and the rotor assembly 52 so that the end 26 of each of the plurality of conductor bars 24 deforms within the respective one of the plurality of channels 72 (FIG. 10A). For example, the end 26 may expand to match the shape of the respective channel 72 and/or flatten slightly.

Further, after disposing, the method includes brazing the end 26 of each of the plurality of conductor bars 24 to the shorting ring 28, 128 to form the rotor 10 (FIG. 1). For this embodiment, brazing may at least partially dispose the braze material 42 on the faying interface 66 (FIG. 9) between each pair 68 (FIG. 9) of adjacent conductive lamination layers 64 to thereby join each of the plurality of conductive lamination layers 64 and form the shorting ring 28, 128. That is, each conductive lamination layer 64 may be joined to every adjacent conductive lamination layer 64 by brazing. In addition, brazing may dispose the braze material 42 along each of the plurality of conductor bars 24 within each of the plurality of channels 72 (FIG. 10A) to thereby join the plurality of conductor bars 24 to the shorting ring 28, 128. That is, as the braze material 42 transitions from the initial state, i.e., powder form 44, to the flowable state, the braze material 42 may flow through each channel 72 to surround and coat an end portion of each of the plurality of conductor bars 24. For example, the braze material 42 in the flowable state may be drawn along the conductor bars 24 within each respective channel 72 by capillary action as the rotor assembly 52 is compressed within the fixture 56. Therefore, referring to FIG. 10C, in this embodiment of the resulting rotor 10, each conductor bar 24 may be joined to the shorting ring 28, 128 by both a mechanical interlock, i.e., the deformed or shaped end 26, and a chemical bond, i.e., the brazed join.

In yet another embodiment, as described with reference to FIGS. 9 and 11A-11C, disposing includes inserting the end 26 of each of the plurality of conductor bars 24 within a respective one of the plurality of channels 72 (FIG. 11A) so that the end 26 protrudes from the exterior surface 76 (FIG. 11A) of the shorting ring 28, 128, and the mating surface 74 (FIG. 11A) abuts the end surface 20 of the steel lamination stack 16. That is, in this embodiment, each of the plurality of channels 72 also extends from the mating surface 74 to the exterior surface 76 through the entire thickness 36 (FIG. 9) of the shorting ring 28, 128, and the conductor bars 24 are inserted into a respective one of the plurality of channels 72 so that each end 26 protrudes from the exterior surface 76. Further, after inserting, the method includes depositing the braze material 42, e.g., in powder form 44 (FIG. 5B), within each of the plurality of channels 72 to thereby form the rotor assembly 52.

Referring now to FIG. 11B, for this embodiment, the method includes, after disposing, deforming the end 26 of each of the plurality of conductor bars 24, wherein deforming includes compressing the shorting ring 28, 128 and the rotor assembly 52 so that the end 26 of each of the plurality of conductor bars 24 contacts the exterior surface 76 and deforms within the respective one of the plurality of channels 72. That is, as best shown in FIG. 11C, compressing may include cold-heading the end 26 of each of the plurality of conductor bars 24 to thereby flatten the end 26 against the exterior surface 76. As used herein, the terminology cold-heading refers to a metal-working process that compresses the end 26 of each of the plurality of conductor bars 24 extending from the exterior surface 76 of the shorting ring 28, 128 at about ambient temperature to flatten the end 26 into a rivet or coined shape against the exterior surface 76. Therefore, for this embodiment, the method allows for variations in length of each of the plurality of conductor bars 24, since the respective end 26 of each of the plurality of conductor bars 24 is deformed against the exterior surface 76. In addition, compressing further compacts the rotor assembly 52 and shorting ring 28, 128 to form the rotor 10 (FIG. 11C).

Further, for this embodiment, after disposing, the method includes brazing the end 26 of each of the plurality of conductor bars 24 to the shorting ring 28, 128 to form the rotor 10 (FIG. 11C). For this embodiment, brazing may at least partially dispose the braze material 42 on the faying interface 66 (FIG. 9) between each pair 68 (FIG. 9) of adjacent conductive lamination layers 64 to thereby join each of the plurality of conductive lamination layers 64 and form the shorting ring 28, 128. That is, each conductive lamination layer 64 may be joined to every adjacent conductive lamination layer 64 by brazing. In addition, brazing may dispose the braze material 42 along each of the plurality of conductor bars 24 within each of the plurality of channels 72 to thereby join the plurality of conductor bars 24 to the shorting ring 28, 128. That is, as the braze material 42 transitions from the initial state to the flowable state, the braze material 42 may flow through each channel 72 (FIG. 11A) to surround and coat an end portion of each of the plurality of conductor bars 24. For example, the braze material 42 in the flowable state may be drawn along the conductor bars 24 within each respective channel 72 by capillary action as the rotor assembly 52 (FIGS. 11A and 11B) is compressed within the fixture 56. Therefore, in this embodiment, each conductor bar 24 may be joined to the shorting ring 28, 128 by both a mechanical interlock, i.e., the deformed or shaped end 26, and a chemical bond, i.e., the brazed join.

As such, the method as described above forms a strong join between the plurality of conductor bars 24 and the shorting ring 28, 128 that can adequately withstand inertial forces during rotor operation. Further, the method may be performed within an economical cycle time, and provides rotors 10 having excellent mechanical and structural integrity. The method may form copper rotors 10, and also allows for steel lamination stacks 16 (FIG. 2) having conductor bars 24 arranged in a skewed configuration. As such, the rotors 10 formed by the method are useful for applications requiring electromagnetic devices (not shown) having excellent power density. In addition, in one embodiment, the method uses solid shorting rings 28, 128 and therefore minimizes manufacturing complexity of the shorting rings 28, 128. In another embodiment, the method uses laminated shorting rings 28, 128 and provides a strong join between the plurality of conductor bars 24 and the shorting ring 28, 128 such that each of the plurality of conductor bars 24 is both brazed and mechanically interlocked to the shorting ring 28, 128.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of forming a rotor, wherein the rotor includes a plurality of conductor bars each joined to a shorting ring, the method comprising:
   stacking a plurality of conductive lamination layers adjacent one another to define a faying interface between each pair of adjacent conductive lamination layers and thereby form the shorting ring;
   wherein each of the plurality of conductive lamination layers defines a plurality of cavities therethrough, and wherein the shorting ring has an outer edge, a mating surface, and an exterior surface spaced apart from the mating surface;
   wherein the rotor is rotatable about an axis of rotation and further wherein the exterior surface extends along a plane that is perpendicular to the axis of rotation;
   after stacking, aligning each of the plurality of cavities of one of the plurality of conduction lamination layers with each of the plurality of cavities of every adjacent conductive lamination layer to thereby define a plurality of channels through the shorting ring, wherein each of the plurality of channels extends from the mating surface to the exterior surface through an entire thickness of the shorting ring and the channels are spaced apart from one another along the outer edge;
   after aligning, disposing:
      an end of each of the plurality of conductor bars within a respective one of the plurality of cavities; and
      an outer surface of each of the plurality of conductor bars within a respective one of the plurality of channels;
   assembling a steel lamination assembly, wherein the steel lamination assembly includes:
      a steel lamination stack defining a plurality of slots therein and having an end surface; and
      the plurality of conductor bars, wherein each of the plurality of conductor bars is disposed within a respective one of the plurality of slots so that an end face of each of the plurality of conductor bars protrudes from the end surface of the steel lamination stack;
   after disposing, deforming the end of each of the plurality of conductor bars so that the end face is flat, extends along the plane, and does not protrude from the exterior surface; and
   after disposing, brazing the end of each of the plurality of conductor bars to the shorting ring to form the rotor, wherein brazing includes depositing a braze material within each of the plurality of channels so that the braze material abuts the shorting ring and abuts and extends along the outer surface of each of the plurality of conductor bars within each of the plurality of channels.

2. The method of claim 1, wherein deforming and brazing joins the end of each of the plurality of conductor bars to the shorting ring.

3. The method of claim 1, wherein deforming is concurrent to brazing.

4. The method of claim 1, wherein the rotor is rotatable about an axis of rotation, and further wherein deforming includes applying a force to the shorting ring along the axis of rotation.

5. The method of claim 1, wherein brazing at least partially disposes the braze material on the faying interface between each pair of adjacent conductive lamination layers to thereby join each of the plurality of conductive lamination layers and form the shorting ring.

6. The method of claim 1, wherein the outer surface is substantially parallel to the axis of rotation, and further wherein brazing disposes the braze material along the outer surface of each of the plurality of conductor bars within each of the plurality of channels to thereby join the plurality of conductor bars to the shorting ring.

7. The method of claim 1, wherein aligning configures the plurality of cavities so that each of the plurality of channels tapers through the entire thickness of the shorting ring.

8. The method of claim 1, wherein deforming includes compressing the shorting ring and the rotor assembly along the axis of rotation so that the end of each of the plurality of conductor bars deforms within the respective one of the plurality of channels.

9. A method of forming a rotor, wherein the rotor includes a plurality of conductor bars each joined to a shorting ring, the method comprising:
   stacking a plurality of conductive lamination layers adjacent one another to define a faying interface between each pair of adjacent conductive lamination layers and thereby form the shorting ring;
   wherein each of the plurality of conductive lamination layers defines a plurality of cavities therethrough, and wherein the shorting ring has an outer edge, a mating surface, and an exterior surface spaced apart from the mating surface;
   wherein the rotor is rotatable about an axis of rotation and further wherein the exterior surface extends along a plane that is perpendicular to the axis of rotation;
   after stacking, aligning each of the plurality of cavities of one of the plurality of conductive lamination layers with each of the plurality of cavities of every adjacent conductive lamination layer to thereby define a plurality of channels through the shorting ring, wherein each of the plurality of channels extends from the mating surface to the exterior surface through an entire thickness of the shorting ring and the channels are spaced apart from one another along the outer edge;
   after aligning, disposing:
      an end of each of the plurality of conductor bars within a respective one of the plurality of cavities; and
      an outer surface of each of the plurality of conductor bars within a respective one of the plurality of channels;
   assembling a steel lamination assembly, wherein the steel lamination assembly includes:
      a steel lamination stack defining a plurality of slots therein and having an end surface; and
      the plurality of conductor bars, wherein each of the plurality of conductor bars is disposed within a respective one of the plurality of slots so that an end face of each of the plurality of conductor bars protrudes from the end surface of the steel lamination stack;
   further wherein disposing includes inserting the outer surface of each of the plurality of conductor bars within a respective one of the plurality of channels so that the end protrudes from the exterior surface of the shorting ring and the mating surface abuts the end surface of the steel lamination stack;

after inserting, depositing a braze material within each of the plurality of channels to thereby form a rotor assembly;

after disposing, deforming the end of each of the plurality of conductor bars so that the end face is flat, extends along the plane, and does not protrude from the exterior surface, wherein deforming includes compressing the shorting ring and the rotor assembly so that the end of each of the plurality of conductor bars deforms within the respective one of the plurality of channels; and after depositing, brazing the end of each of the plurality of conductor bars to the shorting ring to form the rotor, wherein brazing at least partially disposes the braze material on the faying interface between adjacent conductive lamination layers to thereby join each of the plurality of conductive lamination layers and form the shorting ring, and further wherein brazing disposes the braze material along the outer surface of each of the plurality of conductor bars within each of the plurality of channels so that the braze material abuts the shorting ring and abuts and extends along the outer surface of each of the plurality of conductor bars to form the rotor.

* * * * *